US012584294B2

(12) United States Patent
Li et al.

(10) Patent No.: US 12,584,294 B2
(45) Date of Patent: Mar. 24, 2026

(54) METHOD FOR CONTROLLING A BACKHOE LOADER AND BACKHOE LOADER

(71) Applicant: JIANGSU XCMG CONSTRUCTION MACHINERY RESEARCH INSTITUTE LTD., Xuzhou (CN)

(72) Inventors: Mingshuai Li, Xuzhou (CN); Yanbo Geng, Xuzhou (CN); Zhe Ji, Xuzhou (CN)

(73) Assignee: JIANGSU XCMG CONSTRUCTION MACHINERY RESEARCH INSTITUTE LTD., Xuzhou (CN)

( * ) Notice: Subject to any disclaimer, the term of this patent is extended or adjusted under 35 U.S.C. 154(b) by 291 days.

(21) Appl. No.: 18/289,253

(22) PCT Filed: Aug. 31, 2022

(86) PCT No.: PCT/CN2022/116138
§ 371 (c)(1),
(2) Date: Nov. 2, 2023

(87) PCT Pub. No.: WO2024/040629
PCT Pub. Date: Feb. 29, 2024

(65) Prior Publication Data

US 2024/0426082 A1 Dec. 26, 2024

(30) Foreign Application Priority Data

Aug. 25, 2022 (CN) ........................ 202211027155.5

(51) Int. Cl.
*E02F 9/22* (2006.01)
*E02F 3/96* (2006.01)
(Continued)

(52) U.S. Cl.
CPC ............ *E02F 9/2235* (2013.01); *E02F 3/964* (2013.01); *E02F 9/2246* (2013.01);
(Continued)

(58) Field of Classification Search
CPC ..... E02F 9/2232; E02F 9/2235; E02F 9/2246; E02F 9/2296; E02F 9/2264; E02F 9/26;
(Continued)

(56) References Cited

U.S. PATENT DOCUMENTS 4,065,228 A * 12/1977 McMillan ............ F04B 49/002
60/449
4,076,459 A * 2/1978 Adams .................... F04B 1/324
417/217
(Continued)

FOREIGN PATENT DOCUMENTS

CA 2008280 A1 7/1990
CN 1186915 A 7/1998
(Continued)

OTHER PUBLICATIONS

International Search Report and Written Opinion for PCT/CN2022/116138 dated Dec. 19, 2022 (11 pages).
(Continued)

*Primary Examiner* — Grant Moubry
(74) *Attorney, Agent, or Firm* — Merchant & Gould P.C.

(57) ABSTRACT

The present disclosure relates to a method for controlling a backhoe loader and a backhoe loader, and relates to the field of engineering machinery. The method for controlling a backhoe loader includes: setting a power upper threshold P_0 for a variable displacement pump of the backhoe loader according to an operating mode of the backhoe loader; where the backhoe loader includes an engine, the variable displacement pump, a traveling system, a loading operation system, and a digging operation system; the operating mode includes: a traveling mode, a loading operation mode, and a digging operation mode; and adjusting the power upper threshold P_0 of the variable displacement pump according to an actual load of the backhoe loader in a current operating mode. In the technical solutions, the power upper thresholds
(Continued)

P_0 are different in different operating modes. Power of the variable displacement pump is adjusted in real time.

19 Claims, 2 Drawing Sheets

(51) Int. Cl.
*E02F 9/24* (2006.01)
*E02F 9/26* (2006.01)
*F15B 20/00* (2006.01)

(52) U.S. Cl.
CPC .............. *E02F 9/2296* (2013.01); *E02F 9/24* (2013.01); *E02F 9/26* (2013.01); *F15B 20/007* (2013.01)

(58) Field of Classification Search
CPC ..... E02F 9/24; E02F 9/22; E02F 3/964; F15B 20/007
See application file for complete search history.

(56) References Cited

U.S. PATENT DOCUMENTS

| | | | |
|---|---|---|---|
| 4,382,485 A | 5/1983 | Kirkham | |
| 4,637,781 A | 1/1987 | Akiyama et al. | |
| 4,773,369 A | 9/1988 | Kobayashi et al. | |
| 5,469,646 A | 11/1995 | Takamura | |
| 5,944,492 A | 8/1999 | Konishi et al. | |
| 6,073,442 A * | 6/2000 | Creger | E02F 9/2025 60/449 |
| 6,311,489 B1 | 11/2001 | Stangl et al. | |
| 6,434,864 B1 | 8/2002 | Epshteyn | |
| 9,260,838 B2 * | 2/2016 | Sawada | E02F 9/22 |
| 9,890,517 B2 | 2/2018 | Kaneko et al. | |
| 2008/0202468 A1 | 8/2008 | Grill et al. | |
| 2008/0223631 A1 | 9/2008 | Filla et al. | |
| 2010/0262353 A1 | 10/2010 | Hyodo et al. | |
| 2013/0151098 A1 | 6/2013 | Berry et al. | |
| 2015/0197920 A1 | 7/2015 | Mckee et al. | |
| 2016/0230369 A1 | 8/2016 | Kaneko et al. | |
| 2016/0326720 A1 | 11/2016 | Uno et al. | |
| 2019/0376259 A1 | 12/2019 | Pence et al. | |
| 2021/0355657 A1 * | 11/2021 | Hyodo | E02F 9/202 |

FOREIGN PATENT DOCUMENTS

| | | | |
|---|---|---|---|
| CN | 101148895 | A | 3/2008 |
| CN | 101302963 | A | 11/2008 |
| CN | 102937085 | A | 2/2013 |
| CN | 203113417 | U | 8/2013 |
| CN | 103290879 | A | 9/2013 |
| CN | 103557151 | A | 2/2014 |
| CN | 104074225 | A | 10/2014 |
| CN | 107044147 | A | 8/2017 |
| CN | 107794968 | A | 3/2018 |
| CN | 111549848 | A | 8/2020 |
| CN | 113104017 | A | 7/2021 |
| CN | 113605486 | B | 1/2022 |
| CN | 216108735 | U | 3/2022 |
| CN | 114879498 | A | 8/2022 |
| EP | 1017942 | A1 | 7/2000 |
| JP | H01294921 | A | 11/1989 |
| JP | 2010095967 | A | 4/2010 |
| KR | 101182552 | B1 | 9/2012 |
| KR | 20140061004 | A | 5/2014 |
| KR | 20210112715 | A | 9/2021 |
| RU | 2698756 | C2 | 8/2019 |
| RU | 2403348 | C2 | 11/2020 |
| WO | 2015104878 | A1 | 7/2015 |

OTHER PUBLICATIONS

Extended European Search Report dated Mar. 14, 2025 for corresponding EP Application No. 22 94 1880 (6 pgs).
First Office Action dated Apr. 11, 2023 for priority Chinese Application No. 202211027155.5 (24 pages including English Translation).
Russian Office Action dated Nov. 20, 2025 for corresponding Russian Application No. 2023131179/03(069136) (16 pages including English Translation).

* cited by examiner

METHOD FOR CONTROLLING A BACKHOE LOADER AND BACKHOE LOADER

CROSS-REFERENCE TO RELATED APPLICATIONS

This application is a National Stage Application of International Application No. PCT/CN2022/116138, filed on Aug. 31, 2022, which claims the benefit of Ser. No. 202211027155.5, filed on Aug. 25, 2022 in China, and which applications are incorporated herein by reference. To the extent appropriate, a claim of priority is made to each of the above disclosed applications.

FIELD OF THE INVENTION

The present disclosure relates to the field of engineering machinery, and more particularly, to a method for controlling a backhoe loader and a backhoe loader

DESCRIPTION OF RELATED ART

A backhoe loader is a multi-functional engineering machinery integrating digging, loading and traveling, and all its functions are powered by its engine. When a digging end operates, its loading and traveling ends do not operate. When traveling for a long distance, its digging and loading ends do not operate. When the loading end operates, it needs to act in combination with the traveling end.

A traveling system includes an engine, a gearbox, a drive axle and a tire drive. Loading operation and digging operation are powered by a hydraulic system, which is driven by the engine, the gearbox, a hydraulic pump, and an oil cylinder.

It is found that there are at least following problems in the related art. The hydraulic system of the existing backhoe loader is a constant displacement pump hydraulic system or a constant power variable displacement pump hydraulic system. Furthermore, when the system is matched, a power of the hydraulic system is too small to make full use of the power of the engine.

SUMMARY OF THE INVENTION

Some embodiments of the present disclosure provide a method for controlling a backhoe loader, which includes the steps of:

setting a power upper threshold $P_0$ of a variable displacement pump of the backhoe loader according to an operating mode of the backhoe loader; wherein the backhoe loader includes an engine, the variable displacement pump, a traveling system, a loading operation system, and a digging operation system; and the operating mode includes: a traveling mode, a loading operation mode, and a digging operation mode;

and adjusting the power upper threshold $P_0$ of the variable displacement pump according to an actual load of the backhoe loader in a current operating mode.

In some embodiments, the adjusting the power upper threshold $P_0$ of the variable displacement pump according to an actual load of the backhoe loader in a current operating mode includes:

determining whether the backhoe loader has a risk of overloading; and lowering the power upper threshold $P_0$ of the variable displacement pump when the backhoe loader has the risk of overloading.

In some embodiments, it is determined whether there is the risk of overloading according to: operating condition characteristics, load changes, and changes of a rotating speed of the engine.

In some embodiments, the adjusting the power upper threshold $P_0$ of the variable displacement pump according to an actual load of the backhoe loader in a current operating mode includes:

obtaining the actual load of the engine when the backhoe loader does not have the risk of overloading, determining operating condition characteristics according to a load condition within set time, and determining a maximum allowable load of the engine according to the operating condition characteristics;

determining whether the actual load of the backhoe loader is less than the maximum allowable load of the engine; and increasing the power upper threshold $P_0$ of the variable displacement pump when the actual load of the backhoe loader is less than the maximum allowable load of the engine.

In some embodiments, the setting the power upper threshold $P_0$ of the variable displacement pump according to the operating mode of the backhoe loader includes:

setting the power upper threshold of the variable displacement pump of the backhoe loader to be $P_{01}$ when the operating mode of the backhoe loader is the loading operation mode, where sum of the power upper threshold $P_{01}$ and a maximum power $P_W$ required by the traveling system is greater than a power $P_{engine}$ of the engine, i.e. $P_{01}+P_W>P_{engine}$.

In some embodiments, the setting the power upper threshold $P_0$ of the variable displacement pump according to the operating mode of the backhoe loader includes:

setting the power upper threshold $P_{02}$ of the variable displacement pump of the backhoe loader to be a maximum available power $X_0$% of the engine when the operating mode of the backhoe loader is the digging operation mode, the engine being at the same rotating speed $P_{02}>P_{01}$.

In some embodiments, the $X_0$ ranges between 85 and 100.

In some embodiments, the setting the power upper threshold $P_0$ of the variable displacement pump according to the operating mode of the backhoe loader includes:

setting the power upper threshold $P_{03}$ of the variable displacement pump of the backhoe loader to be a minimum power of the variable displacement pump when the operating mode of the backhoe loader is the traveling mode.

In some embodiments, when the operating mode is the loading operation mode, the method for controlling a backhoe loader further includes:

in the loading operation mode, determining whether the loading operation system is adjusted to an economic mode;

a maximum value of the rotating speed $N_{engine}$ of the engine does not exceed a set economic rotating speed $N_0$ when the determination result is YES.

In some embodiments, the set economic rotating speed $N_0$ is between 1,500 rpm and 2,000 rpm.

Some embodiments of the present disclosure provide a backhoe loader, which includes:

an engine;

a variable displacement pump in driving connection with the engine;

a traveling system in driving connection with the engine;

a loading operation system hydraulically connected to the variable displacement pump;

a digging operation system hydraulically connected to the variable displacement pump;

and a control system in communication connection with both the engine and the variable displacement pump, the control system being configured to perform the method for controlling a backhoe loader provided by any one of the technical solutions of the present disclosure.

In some embodiments, the control system includes:

a vehicle controller in communication connection with the variable displacement pump;

and an engine ECM in communication connection with the vehicle controller and in communication connection with the engine.

In some embodiments, the control system further includes:

an economic mode switch in communication connection with the vehicle controller.

In some embodiments, the backhoe loader further includes:

a display in communication connection with the vehicle controller.

In some embodiments, the control system is configured to calculate a rotating speed n of the engine using a set formula based on an implement flow Q inputted from the display, and transmit a signal of the rotating speed of the engine to the engine ECM to control the rotating speed n of the engine.

In some embodiments, the set formula is $n=Q/V_{MAX}$, where n represents the rotating speed of the engine, Q represents the implement flow, and $V_{MAX}$ represents a maximum displacement of the variable displacement pump.

In some embodiments, the control system is further configured to shield a foot throttle signal and a hand throttle signal of the engine when the control system receives an implement flow signal, and the control system does not control the rotating speed n of the engine according to the foot throttle signal and the hand throttle signal of the engine.

In some embodiments, the backhoe loader includes an automatic shift mode and a power shift mode, where the automatic shift mode and the power shift mode are switched by means of the display.

In some embodiments, the control system is configured to set an economic rotating speed of the engine, and a power of the engine is set as a rated power when the rotating speed $N_{engine}$ of the engine is within a numerical range of the set economic rotating speed $N_0$.

In some embodiments, the set economic rotating speed $N_0$ is between 1,500 rpm and 2,000 rpm.

According to the technical solutions, the backhoe loader is provided with an adjustable variable displacement pump, and the method for controlling a backhoe loader includes: setting a power upper threshold $P_0$ for the variable displacement pump of the backhoe loader according to the operating mode of the backhoe loader; and adjusting the power upper threshold $P_0$ of the variable displacement pump according to an actual load of the backhoe loader in a current operating mode, such that a maximum actual power of the variable displacement pump may be the power upper threshold $P_0$. In the technical solutions, the power upper thresholds $P_0$ are different in different operating modes. In the different operating modes, according to actual load conditions of the system, power of the variable displacement pump can be adjusted in real time, steplessly and continuously to maximize an output power of the engine, thereby improving operating efficiency, increasing energy efficiency, and reducing energy consumption.

BRIEF DESCRIPTION OF THE DRAWINGS

The accompanying drawings described herein are intended for providing further understanding of the present disclosure, and constituting a part of the present disclosure. The exemplary embodiments of the present disclosure and description thereof are intended for explaining the present disclosure, but not for constituting an improper limitation on the present disclosure. In the drawings.

Figure 1:
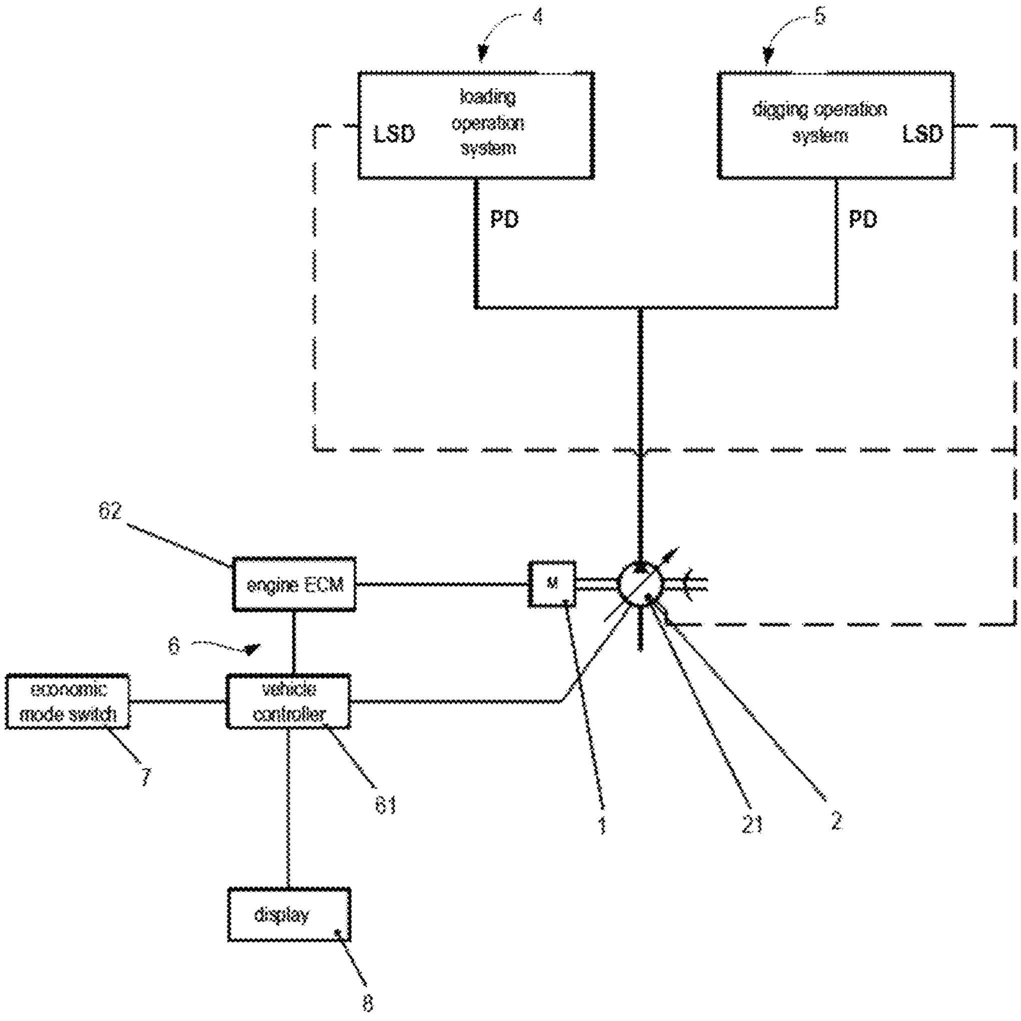
FIG. 1 is a schematic structural diagram of a backhoe loader provided by some embodiments of the present disclosure.

Reference numerals in the accompanying drawings:

1. engine; 2. variable displacement pump; 3. traveling system; 4. loading operation system; 5. digging operation system; 6. control system; 7. economic mode switch; 8. display; 21. variable displacement pump power control valve; 61. vehicle controller; and 62. engine ECM.

DESCRIPTION OF THE INVENTION

The technical solutions provided by the present disclosure will be described in more detail below with reference to FIGS. 1 to 4.

Referring to FIG. 1, a backhoe loader is a device that can realize digging and loading. The backhoe loader includes an engine 1, a variable displacement pump 2, a traveling system 3, a loading operation system 4, a digging operation system 5, and a control system 6. The variable displacement pump 2 controls hydraulic parts of the loading operation system 4 and the digging operation system 5. The variable displacement pump 2 serves, together with the respective hydraulic parts of the loading operation system 4 and the digging operation system 5, as a hydraulic system of the backhoe loader.

The engine 1 is configured to provide power required by the backhoe loader. A maximum allowable power of the engine 1 refers to a maximum power that can be used by the engine 1 for operation. When an operation load is greater than the maximum allowable power of the engine 1, the backhoe loader may have a risk overloading, which may cause the backhoe loader to malfunction or fail to function properly. Of course, the risk of overloading is not limited to the above case, and other cases may also likely lead to the risk of overloading. For example, when a rotating speed of the engine 1 drops more, the risk of overloading may likely be caused subsequently. For another example, when the load has been increasing rapidly, the risk of overloading also may likely be caused subsequently.

The greater proportion of the power supplied by the engine 1 is used for operation, the more efficient the hydraulic system is. The operation includes loading, digging, and traveling.

The backhoe loader has a mechanical connection structure, a hydraulic system, and a signal connection part. In FIG. 1, the above three connection modes are illustrated simultaneously. The engine 1 achieves driving connection with the variable displacement pump 2 and the traveling system 3 through mechanical connection. The variable displacement pump 2 is hydraulically connected to the loading operation system 4 and the digging operation system 5 through hydraulic pipelines. The control system 6 is in communication connection with the engine 1, the variable displacement pump 2, an economic mode switch 7 and a display 8 described hereinafter.

The engine 1 is in driving connection with the variable displacement pump 2. Specifically, the engine 1 is in driving connection with a torque converter 31, the torque converter 31 is in driving connection with a gearbox 32, and the gearbox 32 is in driving connection with the variable displacement pump 2 to drive the variable displacement pump 2 to operate.

Figure 2:
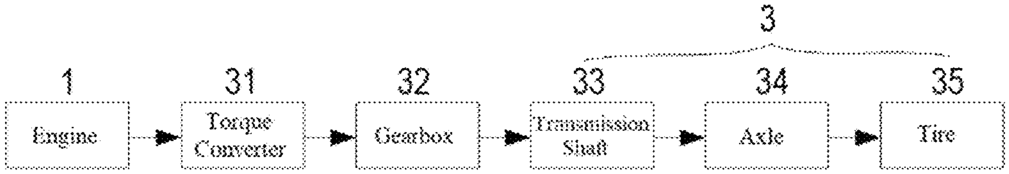
FIG. 2 is a schematic diagram of a connection relationship between an engine and a traveling system of the backhoe loader provided by some embodiments of the present disclosure.

The engine 1 is also in driving connection with the traveling system 3. Referring to FIG. 2, the traveling system 3 includes a transmission shaft 33, an axle 34, and a tire 35. The engine 1 drives the gearbox 32 via the torque converter 31, the gearbox 32 drives the transmission shaft 33, the transmission shaft 33 drives the axle 34, and the axle 34 drives the tire 35 to rotate, thereby realizing traveling of the backhoe loader.

The variable displacement pump 2 is hydraulically connected to the loading operation system 4 and the digging operation system 5. According to different operating modes, the variable displacement pump 2 selectively drives the loading operation system 4 or the digging operation system 5 to operate. Referring to FIG. 1, the loading operation system 4 includes a loading multi-way valve, and the variable displacement pump 2 is in fluid communication with the loading multi-way valve. The digging operation system 5 includes a digging multi-way valve, and the variable displacement pump 2 is in fluid communication with the digging multi-way valve. Each of the loading operation system 4 and the digging operation system 5 includes implements, where the implements of the loading operation system 4 are configured to realize a loading operation, and the implements of the digging operation system 5 are configured to realize a digging operation. Herein all the implements of loading operation system 4 and digging operation system 5 are collectively referred to as the implements.

Operation modes of the backhoe loader include a loading operation mode, a digging operation mode, and a traveling mode.

In the loading operation mode, the backhoe loader carries out both the loading operation and the driving operation, but does not carry out the digging operation. In the loading operation mode, the power consumed by the backhoe loader is mainly used for the loading operation and the traveling operation.

In the digging operation mode, the backhoe loader only carries out the digging operation, but does not carry out the traveling operation or the loading operation. In the digging operation mode, the power consumed by the backhoe loader is mainly used for the digging operation.

In the traveling mode, the backhoe loader only travels, and does not carry out the digging operation or the loading operation. In the traveling mode, the power consumed by the backhoe loader is mainly used for vehicle movement.

The variable displacement pump 2 is driven by the engine 1 controlled by the control system 6 including a vehicle controller 61 and an engine ECM 62, which are connected in communication with each other. The engine 1 is controlled by the engine ECM 62. ECM is short for Engine Control Module. The vehicle controller 61 is in communication connection with the variable displacement pump 2, the economic mode switch 7, the display 8, the loading multi-way valve, and the digging multi-way valve, etc. Parameters related to the operation of the backhoe loader, such as real-time power, vehicle speed, vehicle speed change, load and load change or the like, are transmitted to the display 8 by the vehicle controller 61 and displayed on the display 8, to facilitate an operator to learn the current operating parameters of the backhoe loader.

A main parameter of the variable displacement pump 2 is power, and the maximum power (i.e. a power upper threshold $P_0$) of the variable displacement pump 2 is adjusted by means of a variable displacement pump power control valve 21. After the power upper threshold $P_0$ is set, it is not constant, but is constantly changed according to actual operating conditions of the backhoe loader. That is, one power upper threshold $P_0$ may be determined in each adjustment period, and after entering a next adjustment period, this power upper threshold $P_0$ will be adjusted again. That is, the power upper threshold $P_0$ changes in real time.

The variable displacement pump power control valve 21 adopts direct proportional control or inverse proportional control. When the variable displacement pump power control valve 21 adopts the inverse proportional control, the power of the variable displacement pump 2 is always the maximum power in the event of failure of the variable displacement pump power control valve 21. In this case, the power of the engine 1 is a set rated power when the engine 1 of the backhoe loader operates within an economic rotating speed range, and the backhoe loader can still operate normally in the event of failure of the variable displacement pump power control valve 21. However, when the variable displacement pump power control valve 21 adopts the direct proportional control, the power of the variable displacement pump 2 is a minimum power in the event of failure of the variable displacement pump power control valve 21. In this case, it is difficult for the backhoe loader to operate normally.

How to select the required variable displacement pump 2 is described below. A maximum displacement $V_{MAX}$ of the variable displacement pump 2 is calculated and determined under the set economic rotating speed $N_0$ according to flow required for a conventional digging operation of the backhoe loader. After the variable displacement pump 2 is selected, the maximum displacement $V_{MAX}$ of the variable displacement pump 2 is determined and is a fixed value. In some embodiments, the set economic rotating speed $N_0$ of the variable displacement pump 2 is between 1,500 rpm and 2,000 rpm. When the digging operation system 5 is in the operating state, a maximum operating speed of a digging end is set to an optimum economic operating speed $N_0$.

A formula for calculating the flow Q required for implements of the hydraulic system is as follows: $Q=V_{MAX}*N_{engine}$. $V_{MAX}$ represents the maximum displacement of the variable displacement pump 2, and $N_{engine}$ represents the rotating speed of the engine. In the above formula, $V_{MAX}$ is a fixed value, and $V_{MAX}$ is calculated according to the flow required for conventional loading and digging operations (excluding the implements) under the economic rotating speed $N_0$. When the implements Q are determined, the rotating speed $N_{engine}$ of the engine can be calculated according to this formula. Under the drive of the rotating speed $N_{engine}$ of the engine, the flow Q required by the implements can be calculated according to this formula.

When the flow Q required by the implements is greater (greater than the flow required for the conventional loading or digging operation) and an operating pressure is not high, the required flow Q can be realized by increasing the rotating speed $N_{engine}$ of the engine 1 to be greater than the economic rotating speed $N_0$.

When the implements are operating, the system gives priority to meeting the flow Q required by the implements. When the control system 6 detects an implement flow input signal on the display 8 and a solenoid valve (located on the digging or loading multi-way valve) for controlling the implements receives a current signal, the rotating speed $N_{engine}$ calculated by the control system 6 according to the above formula $Q=V_{MAX}*N_{engine}$ is transmitted to the engine ECM 62, which controls the engine 1 to output at the desired rotating speed. The rotating speed n of the engine is not controlled according to a foot throttle signal or a hand throttle signal of the engine. In this case, the control system 6 shields the foot throttle signal and the hand throttle signal of the engine. That is, the control system 6 does not control the rotating speed n of the engine according to any of the foot throttle signal and the hand throttle signal of the engine, but controls the rotating speed n of the engine according to the implement flow signal. When the implement has no flow input signal, it means that the implement is not operating. In this case, the control system 6 determines the rotating speed required by the engine 1 according to the hand throttle signal or the foot throttle signal, and sends the signal to the engine ECM 62, such that the engine ECM 62 controls the engine 1 to output according to the required rotating speed. The above process is also known as high priority of the rotating speed $N_{engine}$ required when the implement operates.

In the above process of controlling the rotating speed $N_{engine}$ of the engine, an economic mode switch 7 is further provided. The economic mode switch 7 is a switch specially configured to control a maximum value of the rotating speed $N_{engine}$ of the engine 1 of the backhoe loader. When the economic mode switch 7 is pressed, the maximum value of the rotating speed $N_{engine}$ of the engine is set to the economic rotating speed NO, such that the backhoe loader can save energy while ensuring the operation efficiency. The economic mode switch 7 is suitable for the loading operation mode. Specifically, in the loading operation mode, when a distance needing to move during the loading operation is closer, a function is enabled by controlling the economic mode switch 7, at this moment, the rotating speed $N_{engine}$ of the engine 1 is an idle speed NO, and a vehicle speed drops. However, the engine 1 is configured to be below: the power of the engine 1 is set as a rated power when the rotating speed $N_{engine}$ of the engine 1 is within a numerical range of the set economic rotating speed $N_0$. Therefore, the hydraulic system of the backhoe loader can still reach a maximum flow and pressure, such that the backhoe loader can be more energy-efficient without reducing the operating efficiency.

The traveling system 3 is configured to control traveling of the vehicle. In some embodiments, the backhoe loader includes an automatic shift mode and a power shift mode. The automatic shift mode is configured for automatically switching a gear position of the traveling system 3 according to an input signal to change a traveling speed. In the power shift mode, the operator manually shifts the gear position to change the traveling speed. The automatic shift mode and the power shift mode may be switched between each other. During the traveling process of the backhoe loader, the operator selects the required shift mode according to actual conditions, and switches between the two modes at any time according to needs. A signal input end of the switching module is arranged on the display 8, and the automatic shift mode and the power shift mode are switched by operating the display 8.

The method for controlling a backhoe loader provided by some embodiments of the present disclosure is described in detail below.

Figure 3:
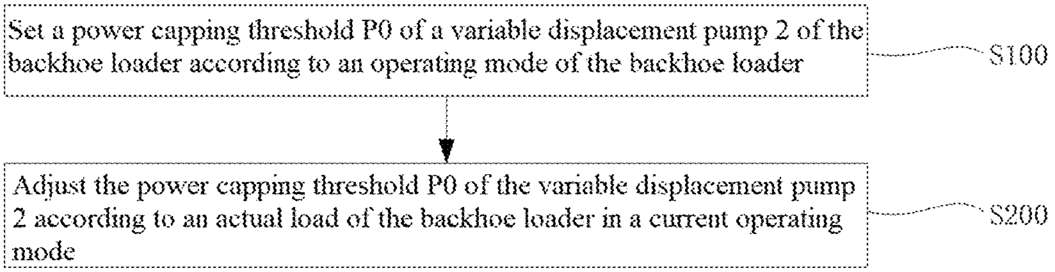
FIG. 3 is a schematic flow diagram of a method for controlling a backhoe loader provided by some embodiments of the present disclosure.

Referring to FIG. 3, some embodiments of the present disclosure provide a method for controlling a backhoe loader, which includes following steps.

In Step S100, a power upper threshold $P_0$ of the variable displacement pump 2 of the backhoe loader is set according to an operating mode of the backhoe loader. The backhoe loader includes the engine 1, the variable displacement pump 2, the traveling system 3, the loading operation system 4, and the digging operation system 5. The operating mode includes: the traveling mode, the loading operation mode, and the digging operation mode.

In Step S100, different power upper thresholds $P_0$ need to be set in different operating modes of the backhoe loader. Specifically, the power upper threshold $P_0$ of the backhoe loader is set in following way.

The power upper threshold of the variable displacement pump 2 of the backhoe loader is set to be $P_{01}$ when the operating mode of the backhoe loader is the loading operation mode, the power upper threshold of the variable displacement pump 2 of the backhoe loader is set to be $P_{01}$, and sum of the power upper threshold $P_{01}$ and a maximum power $P_W$ required by the traveling system 3 is greater than a power $P_{engine}$ of the engine 1, i.e. $P_{01}+P_W>P_{engine}$.

In the loading operation mode, the technical solutions of some embodiments of the present disclosure also provide an economic mode. Specifically, in the loading operation mode, it is determined whether the loading operation system 4 is adjusted to the economic mode. When it is required to adjust to the economic mode, the maximum value of the rotating speed $N_{engine}$ of the engine 1 in the economic mode does not exceed the set economic rotating speed $N_0$. In some embodiments, the set economic rotating speed $N_0$ is between 1,500 rpm and 2,000 rpm.

When the operating mode of the backhoe loader is the digging operation mode, the power upper threshold $P_{02}$ of the variable displacement pump 2 of the backhoe loader is set to $X_0$% of the maximum available power of the engine 1, and the engine 1 is at the same rotating speed $P_{02}>P_{01}$. A value of X0 ranges from 85 to 100. The power upper threshold $P_{02}$ is 85% to 100% of the power of the engine 1.

In some embodiments, when the operating mode of the backhoe loader is the traveling mode, the power upper threshold $P_{03}$ of the variable displacement pump 2 of the backhoe loader is set to the minimum power of the variable displacement pump 2.

After the power upper threshold $P_0$ of variable displacement pump 2 is set, the backhoe loader is started according to the power upper threshold $P_0$ serving as a maximum power, and a real-time power of the backhoe loader does not exceed the power upper threshold $P_0$. When the real-time power of the backhoe loader is equal to the power upper threshold $P_0$, the backhoe loader makes the best of the power. After the power upper threshold $P_0$ is set, subsequently the power upper threshold $P_0$ can be adjusted cyclically. That is, under different operating modes, according to actual load conditions of the backhoe loader, the power upper threshold $P_0$ is continuously increased or decreased, such that the actual conditions of the backhoe loader meet the set power upper threshold $P_0$. When the power upper threshold $P_0$ is adjusted, a change interval of the actual power of the backhoe loader also changes. When the power upper threshold $P_0$ is increased, the maximum value of the actual power of the backhoe loader is also increased, such that the efficiency of the engine 1 of the backhoe loader can be fully utilized, energy utilization efficiency is improved, energy efficiency is improved, and thus it is more energy-saving. When the power upper threshold $P_0$ is reduced, the maximum value of the actual power of the backhoe loader is also reduced, such that the risk of overloading is not easy to occur, and reliability of the backhoe loader is higher.

In Step S200, the power upper threshold $P_0$ of the variable displacement pump 2 is adjusted according to the actual load of the backhoe loader in the current operating mode.

In the above Step S200, the power of the variable displacement pump 2 is adjusted according to following strategies, such that the power of the variable displacement pump 2 is the maximum power in the current operating mode. When the maximum allowable load in the current operating mode is greater than the power upper threshold $P_0$, the power is increased based on the power upper threshold $P_0$, that is, the power upper threshold $P_0$ is increased. When the maximum allowable load in the current operating mode is less than the power upper threshold $P_0$, the power is reduced based on the power upper threshold $P_0$, and the power upper threshold $P_0$ is reduced.

In the technical solutions, different power upper thresholds $P_0$ of the variable displacement pump 2 are set according to different operating characteristics of the backhoe loader. In the operating process of the backhoe loader, based on the actual operating conditions of the backhoe loader and the actual load of the engine 1, the maximum allowable load of the hydraulic system of the backhoe loader is adjusted in real time, steplessly and continuously. That is, the real-time power of the variable displacement pump 2 is adjusted, to fully utilize the efficiency of the engine 1 of the backhoe loader, improve the energy utilization efficiency, and improve the energy efficiency, thus making it more energy-efficient.

In the loading operation mode, when a required traction force is lower, that is, when the power consumed by the traveling system is smaller, more power is used for a loading part, to improve energy utilization power of the loading operation system 4, thereby improving the operation efficiency of the loading operation system 4. In the digging operation mode, the engine 1 is operating at the economic rotating speed while ensuring that the operation efficiency of the digging operation system 5 is not reduced.

Figure 4:
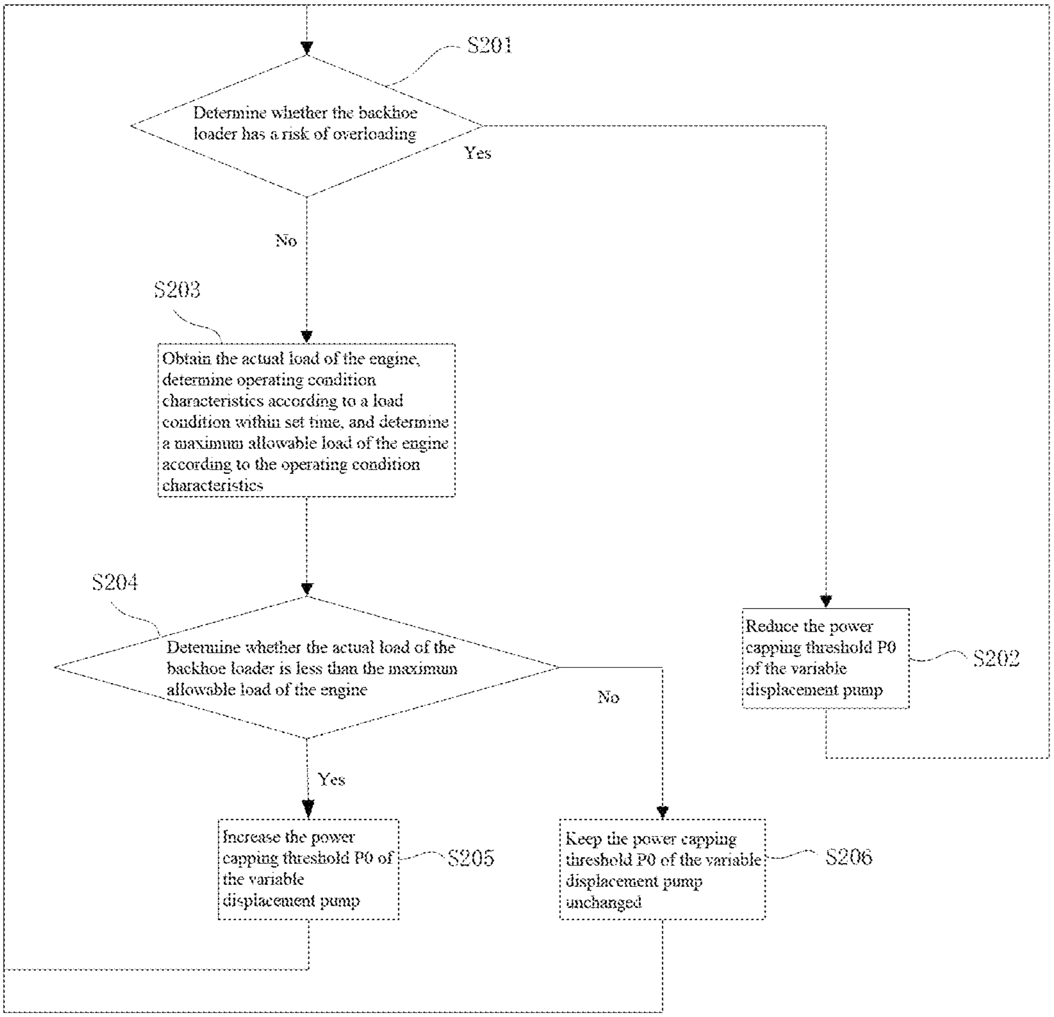
FIG. 4 is a schematic flow diagram of adjusting a power of the variable displacement pump in real time according to a method for controlling a backhoe loader provided by some embodiments of the present disclosure.

Referring to FIG. 4, how to adjust the power upper threshold $P_0$ of the variable displacement pump 2 during the operation of the backhoe loader is described below. The adjustment process is cyclically carried out, and after one adjustment is completed, it enters a next cycle determination.

In Step S201, it is determined whether the backhoe loader has the risk of overloading.

The risk of overloading means that the vehicle is about to overload, which is a pre-determination of the backhoe loader and is an estimated risk. It does not mean that the backhoe loader is already in an overloading state at this moment, but indicates that if the operation continues according to current set power parameters of the pump, the backhoe loader may likely be overloaded in a next moment. In some embodiments, it is determined whether the backhoe loader has the risk of overloading according to: operating condition characteristics, load changes, and changes of the rotating speed of the engine.

For example, some operating conditions are set, and each operating condition type corresponds to some parameters of the backhoe loader. According to the actual parameters collected from the backhoe loader, it is determined to which operating condition type the backhoe loader belongs at present. A risk level is correspondingly set for each operating condition type, and the operating condition meeting a certain risk level is considered as having the risk of overloading.

Parameters used for determining overloading include, for example, when the operation load is greater than the maximum allowable load of the engine 1, there exists the risk of overloading. There exists the risk of overloading when the rotating speed of the engine 1 drops more. There exists the risk of overloading when the load has been increasing rapidly.

In Step S202, the power of the variable displacement pump 2 is reduced when the backhoe loader has the risk of overloading. After the Step S202, it is returned to the Step S201 for a next cycle.

When there exists the risk of overloading, it means that if the backhoe loader continues to operate at the current power setting of the variable displacement pump 2, actual overload may likely occur in the backhoe loader, thus making it difficult for the operation to proceed normally. Therefore, it is required to reduce the power of the variable displacement pump 2.

In some embodiments, the Step S200 further includes the following control strategies.

In Step S203, when the backhoe loader does not have the risk of overloading, the actual load of the engine 1 is obtained, the operating condition characteristics are determined according to the load condition within set time, and the maximum allowable load of the engine is determined according to the operating condition characteristics.

There is a correspondence relationship between the operating condition characteristics, the actual load of the engine 1 and the load condition within the set time, where the correspondence relationship is set in advance and is stored in the control system 6.

There also exists a correspondence relationship between the operating condition characteristics and the maximum allowable load of the engine, which is also preset and stored in the control system 6.

In the actual operating process of the backhoe loader, the actual load of the engine 1 is collected, a corresponding operating condition type is searched out according to the load condition within the set time, and then the maximum allowable load of the engine is searched out according to the operating condition type.

It should be noted that in some other embodiments, when there exists the risk of overloading, the operating condition characteristics of the backhoe loader are also determined, and the maximum allowable load of the engine is determined according to the operating condition characteristics.

In Step S204, it is determined whether the actual load of the backhoe loader is less than the maximum allowable load of the engine 1.

When the backhoe loader does not have the risk of overloading and the actual load does not exceed the maximum allowable load of engine 1, this means that current operating parameters do not reach maximum allowable parameters of the backhoe loader, and the backhoe loader further improves the operating efficiency or completes the operation with more sufficient power.

In Step S205, when the actual load of the backhoe loader is less than the maximum allowable load of the engine 1, the power upper threshold $P_0$ of the variable displacement pump 2 is increased. After the Step S205, it is returned to the Step S201 for a next cycle.

At this moment, the maximum value of the actual power of the variable displacement pump 2 is the increased power upper threshold $P_0$ of the variable displacement pump 2. An increased numerical range corresponds to the maximum allowable load of the engine 1. When the actual power of the variable displacement pump 2 is close to or equal to the maximum allowable load of the engine 1, the real-time power of the variable displacement pump 2 is not to be increased any more.

In Step S206, when the actual load of the backhoe loader is not less than the maximum allowable load of the engine 1, the power upper threshold $P_0$ of the variable displacement pump 2 is remains unchanged. After the Step S206, it is returned to the Step S201 for a next cycle.

The above technical solutions realize real-time and stepless adjustment of the actual power of the variable displacement pump 2. Moreover, a maximum actual power of the variable displacement pump 2 is always the maximum allowable power in the current operating mode, which greatly improves the operation efficiency of the backhoe loader and improves the energy utilization efficiency of the backhoe loader.

In some embodiments, when the operating mode is the loading operation mode, the method for controlling a backhoe loader further includes: in the loading operation mode, determining whether the loading operation system 4 is adjusted to an economic mode. A maximum value of the rotating speed $N_{engine}$ of the engine 1 does not exceed the set economic rotating speed $N_0$ when the determination result is YES. In some embodiments, the set economic rotating speed $N_0$ is between 1,500 rpm and 2,000 rpm.

Some specific application scenarios are introduced below.

Under a light-load state of a loose material, when the backhoe loader is in the loading operation mode, the vehicle controller 61 actively increases the set power of the variable displacement pump power control valve 21 of the variable displacement pump 2 in real time when it detects that the actual load of the engine 1 is lower through the engine ECM 62 and determines that there is no risk of overloading, such that the hydraulic system has a larger power and a higher loading efficiency. Under a heavy-load state of a dense material, the vehicle controller 61 actively lowers the power upper threshold $P_0$ of the variable displacement pump 2 in real time when it detects that the load of the engine 1 is higher through the engine ECM 62 and determines that there is the risk of overloading, such that the backhoe loader has a smaller speed drop and thus is not turned off. It can be seen that in the loading operation mode of the backhoe loader, the method for controlling a backhoe loader increases the operation efficiency under the light-load state and has a function of preventing speed drop under the heavy-load state.

In some embodiments, in the loading operation mode, it is further selected whether to use the economic mode. When the economic mode is selected, the rotating speed of the engine 1 ranges from an idle speed to the set economic rotating speed $N_0$, and the maximum value of the rotating speed $N_{engine}$ of the engine 1 does not exceed the set economic rotating speed $N_0$. The power of the engine 1 is set to the rated power when the rotating speed $N_{engine}$ of the engine 1 is equal to the set economic rotating speed $N_0$, the operation efficiency of the hydraulic system is not reduced, and it is more energy-efficient.

In some embodiments, when the loading operation requires a shorter distance to be moved, the economic mode is adopted. In this case, the maximum value of the rotating speed $N_{engine}$ of the engine 1 is reduced to the economic rotating speed $N_0$. The vehicle speed decreases slightly, but when there is no risk of overloading, the vehicle controller 61 may actively increase the power upper threshold $P_0$ of the variable displacement pump power control valve 21 of the variable displacement pump 2, such that the hydraulic system can still reach the maximum flow and pressure, such that it is more energy-efficient while the operation efficiency is not reduced.

The maximum displacement $V_{MAX}$ of the variable displacement pump 2 is obtained by calculation according to the flow required for the conventional loading and digging operations (excluding the implements) at the economic rotating speed $N_0$. When the rotating speed $N_{engine}$ of the engine 1 is greater than the economic rotating speed $N_0$, the flow required by the conventional operation can be reached, so large-flow auxiliary implements can be selected, which expands a range of the implements adaptable to this machine, and the flow required by the implements can be selected through the panel of the display 8.

When the backhoe loader is in the digging operation mode, by setting to different gear positions such as gear position 6, the engine 1 is controlled to be at different speeds, and at each speed, different power upper thresholds $P_0$ are assigned to the variable displacement pump 2.

When the backhoe loader is in the digging operation mode, a top gear position is the economic rotating speed $N_0$ by default. It is allowable for the engine 1 to operate in the range from the idle speed to economic rotating speed $N_0$, and the efficiency of the hydraulic system is not reduced. Moreover, in the digging operation mode, when the rotating speed $N_{engine}$ of the engine 1 is equal to the economic rotating speed $N_0$, the power of the engine 1 can still reach the maximum value; and the digging operation system 5 may be equipped with operation implements having a higher flow but requiring lower pressure than the conventional system. In the digging operation mode, the flow required by the implements may be controlled, set and selected through a panel of the display 8.

In the description of the present disclosure, it is to be understood that the orientations or positions represented by the terms of "center", "longitudinal", "transverse", "front", "back", "left", "right", "vertical", "horizontal", "top", "bottom", "inside", "outside", and the like are based on the accompanying figures, they are merely for ease of a description of the present disclosure and a simplified description instead of being intended to indicate or imply the apparatus or element to have a special orientation or to be configured and operated in a special orientation. Thus, they cannot be understood as limiting of the present disclosure.

Finally, it should be noted that the foregoing embodiments are merely intended for describing the technical solutions of the present disclosure, but not for limiting the present disclosure. Although the present disclosure is described in detail with reference to the preferred embodiments, persons of ordinary skill in the art should understand that they may still make modifications to the specific embodiments of the present disclosure or make equivalent replacements to some technical features without departing from the spirit of the technical solutions of the present disclosure, which shall fall within the scope of the technical solutions claimed in the present disclosure.

The invention claimed is:

1. A method for controlling a backhoe loader, comprising the following steps of:

setting a power upper threshold $P_0$ of a variable displacement pump of the backhoe loader according to an operating mode of the backhoe loader; wherein the backhoe loader comprises an engine, the variable displacement pump, a traveling system, a loading operation system-(4), and a digging operation system; and the operating mode comprises: a traveling mode, a loading operation mode, and a digging operation mode; and adjusting the power upper threshold $P_0$ of the variable displacement pump according to an actual load of the backhoe loader in a current operating mode;

wherein the adjusting the power upper threshold $P_0$ of the variable displacement pump according to an actual load of the backhoe loader in a current operating mode comprises the following steps of:

determining whether the backhoe loader has a risk of overloading; and lowering the power upper threshold $P_0$ of the variable displacement pump when the backhoe loader has the risk of overloading.

2. The method for controlling a backhoe loader according to claim 1, wherein whether there is the risk of overloading is determined according to:

operating condition characteristics, load changes, and changes of a rotating speed of the engine.

3. The method for controlling a backhoe loader according to claim 1, wherein the adjusting the power upper threshold $P_0$ of the variable displacement pump according to an actual load of the backhoe loader in a current operating mode comprises the following steps of:

obtaining the actual load of the engine when the backhoe loader does not have a risk of overloading, determining operating condition characteristics according to a load condition within set time, and determining a maximum allowable load of the engine according to the operating condition characteristics;

determining whether the actual load of the backhoe loader is less than the maximum allowable load of the engine; and increasing the power upper threshold $P_0$ of the variable displacement pump when the actual load of the backhoe loader is less than the maximum allowable load of the engine.

4. The method for controlling a backhoe loader according to claim 1, wherein the setting the power upper threshold $P_0$, of the variable displacement pump according to the operating mode of the backhoe loader comprises:

setting the power upper threshold of the variable displacement pump of the backhoe loader to be $P_{01}$ when the operating mode of the backhoe loader is the loading operation mode, wherein sum of the power upper threshold $P_{01}$ and a maximum power $P_W$ required by the traveling system is greater than a power $P_{engine}$ of the engine, i.e. $P_01+P_W>P_{engine}$.

5. The method for controlling a backhoe loader according to claim 1, wherein the setting the power upper threshold $P_0$ of the variable displacement pump according to the operating mode of the backhoe loader comprises:

setting the power upper threshold $P_{02}$ of the variable displacement pump of the backhoe loader to be a maximum available power $X_0$% of the engine when the operating mode of the backhoe loader is the digging operation mode, the engine being at the same rotating speed $P_{02}>P_{01}$.

6. The method for controlling a backhoe loader according to claim 5, wherein the $X_0$ ranges between 85 and 100.

7. The method for controlling a backhoe loader according to claim 1, wherein the setting the power upper threshold $P_0$ of the variable displacement pump according to the operating mode of the backhoe loader comprises:

setting the power upper threshold $P_{03}$ of the variable displacement pump of the backhoe loader to be a minimum power of the variable displacement pump when the operating mode of the backhoe loader is the traveling mode.

8. The method for controlling a backhoe loader according to claim 1, wherein when the operating mode is the loading operation mode, the method for controlling a backhoe loader further comprises the following steps of:

in the loading operation mode, determining whether the loading operation system is adjusted to an economic mode;

wherein a maximum value of the rotating speed $N_{engine}$ of the engine does not exceed a set economic rotating speed $N_0$ when the determination result is YES.

9. The method for controlling a backhoe loader according to claim 8, wherein the set economic rotating speed $N_0$ is between 1,500 rpm and 2,000 rpm.

10. A backhoe loader, comprising:

an engine;

a variable displacement pump in driving connection with the engine;

a traveling system in driving connection with the engine;

a loading operation system hydraulically connected to the variable displacement pump;

a digging operation system hydraulically connected to the variable displacement pump; and a control system in communication connection with both the engine and the variable displacement pump, the control system being configured to perform the method for controlling a backhoe loader according to claim 1.

11. The backhoe loader according to claim 10, wherein the control system comprises:

a vehicle controller in communication connection with the variable displacement pump; and an engine ECM in communication connection with the vehicle controller and in communication connection with the engine.

12. The backhoe loader according to claim 11, wherein the control system further comprises:

an economic mode switch in communication connection with the vehicle controller.

13. The backhoe loader according to claim 11, further comprising:

a display in communication connection with the vehicle controller.

14. The backhoe loader according to claim 13, wherein the control system is configured to calculate a rotating speed n of the engine using a set formula based on an implement flow Q inputted from the display, and transmit a signal of the rotating speed of the engine to the engine ECM to control the rotating speed n of the engine.

15. The backhoe loader according to claim 14, wherein the set formula is $n=Q/V_{MAX}$, n representing the rotating speed of the engine, Q representing the implement flow, and $V_{MAX}$ representing a maximum displacement of the variable displacement pump.

16. The backhoe loader according to claim 14, wherein the control system is further configured to shield a foot throttle signal and a hand throttle signal of the engine when the control system receives an implement flow signal, and the control system does not control the rotating speed n of the engine according to the foot throttle signal and the hand throttle signal of the engine.

17. The backhoe loader according to claim 13, wherein the backhoe loader comprises an automatic shift mode and a power shift mode, the automatic shift mode and the power shift mode being switched by means of the display.

18. The backhoe loader according to claim 10, wherein the control system is configured to set an economic rotating speed of the engine, and a power of the engine is set as a rated power when the rotating speed $N_{engine}$ of the engine is within a numerical range of the set economic rotating speed $N_0$.

19. The method for controlling a backhoe loader according to claim 18, wherein the set economic rotating speed $N_0$ is between 1,500 rpm and 2,000 rpm.

* * * * *